US008429247B1

(12) United States Patent
Nordman et al.

(10) Patent No.: US 8,429,247 B1
(45) Date of Patent: Apr. 23, 2013

(54) METHOD AND APPARATUS FOR FULFILLING BROWSER REQUESTS FROM A LOCAL CACHE

(75) Inventors: Michael M. Nordman, Mountain View, CA (US); Michael H. Tsao, San Mateo, CA (US); Christopher M. Prince, San Francisco, CA (US); Andrew J. Palay, Mountain View, CA (US)

(73) Assignee: Google Inc., Mountain View, CA (US)

( * ) Notice: Subject to any disclaimer, the term of this patent is extended or adjusted under 35 U.S.C. 154(b) by 412 days.

(21) Appl. No.: 11/809,161

(22) Filed: May 30, 2007

(51) Int. Cl.
*G06F 15/16* (2006.01)

(52) U.S. Cl.
USPC .......................................................... 709/218

(58) Field of Classification Search .................... 709/218
See application file for complete search history.

(56) References Cited

U.S. PATENT DOCUMENTS

| 5,802,292 | A | * | 9/1998 | Mogul | 709/203 |
| 5,878,223 | A | * | 3/1999 | Becker et al. | 709/223 |
| 6,085,226 | A | * | 7/2000 | Horvitz | 709/203 |
| 6,105,028 | A | * | 8/2000 | Sullivan et al. | 1/1 |
| 2004/0210433 | A1 | * | 10/2004 | Elazar et al. | 703/24 |
| 2005/0188051 | A1 | * | 8/2005 | Sneh | 709/213 |
| 2005/0240558 | A1 | * | 10/2005 | Gil et al. | 707/1 |

OTHER PUBLICATIONS

David M. Kristol, HTTP Cookies: Standards, Privacy, and Politics Nov. 2001 ACM Transactions on Internet Technology vol. 1, No. 2 pp. 151-198 (article) pp. 1-48 Pdf.*
David M. Kristol, HTTP Cookies: Standards, Privacy, and Politics Nov. 2001 ACM Transactions on Internet Technology U vol. 1, No. 2 pp. 151-198 (article) pp. 1-48 Pdf.*

* cited by examiner

*Primary Examiner* — Ashok Patel
*Assistant Examiner* — Lawrence Cosby
(74) *Attorney, Agent, or Firm* — Harrity & Harrity, LLP

(57) ABSTRACT

One embodiment of the present invention provides a system that facilitates intercepting browser communication protocol requests at a client. In addition, the system optionally fulfills the requests with content which is locally cached on the client rather than with content from a web server, which is located externally from the client. During operation, the system receives a communication protocol request at a browser's communication protocol stack. In response to the request, the system identifies a Uniform Resource Locator (URL) for the request. The system also determines if an item of content identified by the URL can be retrieved from a local cache. If so, the system fulfills the request from the local cache.

24 Claims, 3 Drawing Sheets

METHOD AND APPARATUS FOR FULFILLING BROWSER REQUESTS FROM A LOCAL CACHE

BACKGROUND

1. Field of the Invention

The present invention relates to web browsers. More specifically, the present invention relates to a method and an apparatus for fulfilling browser requests from a local cache.

2. Related Art

In recent years, computer users have begun to use web-based applications to perform various computational tasks. These web-based applications provide a number of advantages. For example, web-based applications allow a user to access his or her data from any computer or device that has a web browser and network access. Web-based applications also have minimal impact on client resources, which is a significant advantage for resource-constrained computing devices. However, web-based applications have one major drawback: they do not operate efficiently, or in many cases at all, without the presence of a network connection.

In order to facilitate offline browsing, browsers typically provide a caching mechanism which enables web pages that are delivered to the browser to be stored in a browser's local cache. At some subsequent time, if the user attempts to view a previously viewed page and the client does not have a connection to the web server that hosted the web page, the browser can retrieve a copy of the web page from its local cache and can display the copy of the web page to the user.

However, the browser's local cache is not sufficient to reliably run the client-side of a web-based application without network connectivity. Additionally, such caching does not facilitate handling query arguments or conditionally serving local cached resources based on browser cookies.

Hence, what is needed is a method and an apparatus for executing the client-side of a web-based application without the problems listed above.

SUMMARY

One embodiment of the present invention provides a system that facilitates intercepting browser communication protocol requests at a client. In addition, the system optionally fulfills the requests with content which is locally cached on the client rather than with content from a web server, which is located externally from the client. During operation, the system receives a communication protocol request at a browser's communication protocol stack. In response to the request, the system identifies a Uniform Resource Locator (URL) for the request. The system also determines if an item of content identified by the URL can be retrieved from a local cache. If so, the system fulfills the request from the local cache.

In some embodiments of the present invention, the system receives a list of URLs associated with the URL for the request. Next, the system determines if content specified by each URL in the list of URLs is currently in the local cache. Finally, for content that is not currently in the local cache, the system downloads the content specified by each URL in the list of URLs, and stores the content in the local cache.

In some embodiments of the present invention, determining if the item of content identified by the URL can be retrieved from the local cache involves determining if all of the content specified by each URL in the list of URLs can be retrieved from the local cache. If all of the items of content specified by each URL in the list of URLs cannot be retrieved from the local cache, then the system determines that the item of content cannot be retrieved from the local cache.

In some embodiments of the present invention, the system periodically receives an updated list of URLs associated with the URL for the request.

In some embodiments of the present invention, the system downloads the content specified by each URL in the list of URLs in the background while a user is using the browser.

In some embodiments of the present invention, the system determines whether a cookie associated with a user is present on the client. Next, the system fulfills the request from the local cache only if the cookie is present on the client. Note that fulfilling the request may include serving the content based on a value in the cookie while the content is served from the local cache.

In some embodiments of the present invention, the URL includes query arguments. In some embodiments, determining if the item of content identified by the URL can be retrieved from the local cache involves processing a query with the query arguments.

In some embodiments of the present invention, fulfilling the request from the local cache involves processing a server-side script in the item of content.

In some embodiments of the present invention, the system inserts a second item of content into the local cache, and subsequently sends the item of content to the web server.

In some embodiments of the present invention, the communication protocol is HyperText Transfer Protocol (HTTP).

DETAILED DESCRIPTION

Figure 1:
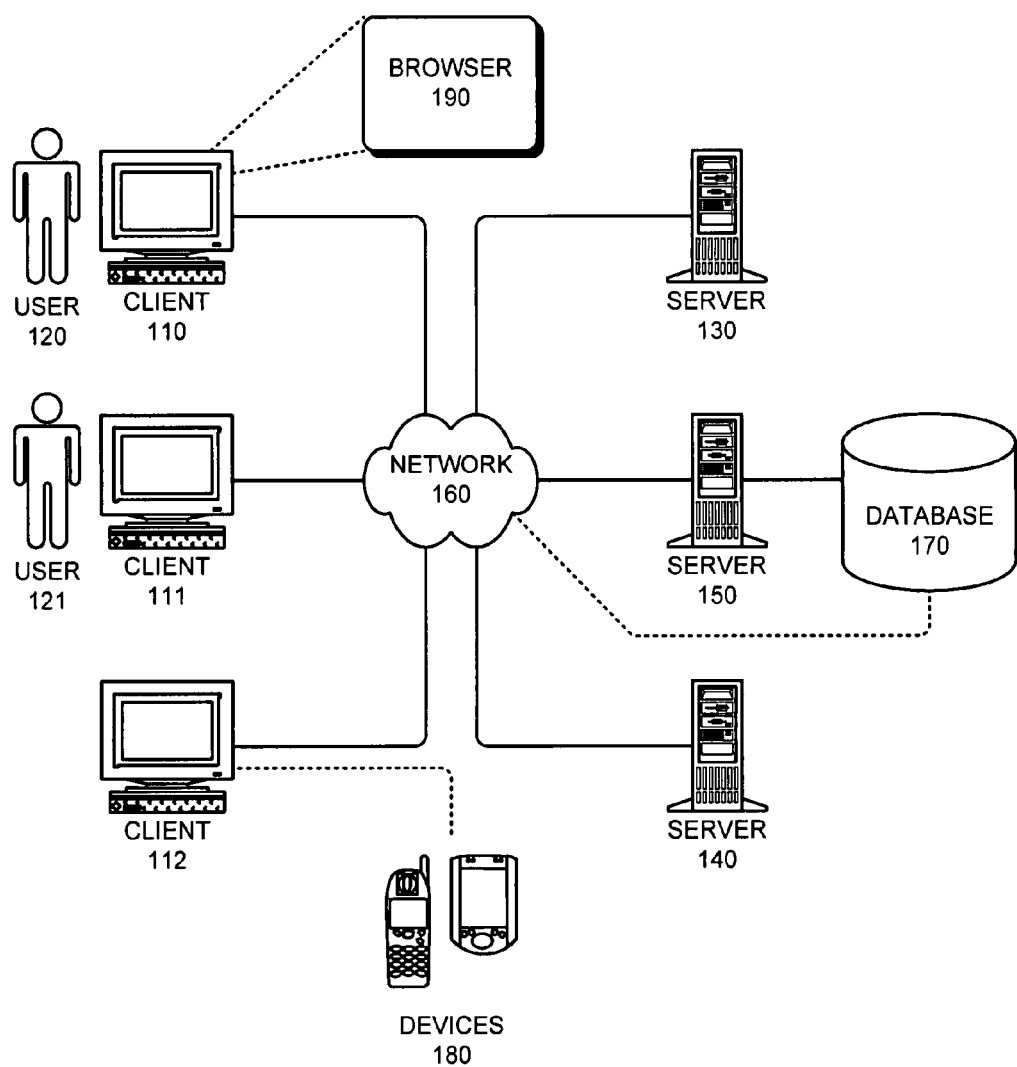
FIG. 1 illustrates a computing environment in accordance with an embodiment of the present invention.

The following description is presented to enable any person skilled in the art to make and use the invention, and is provided in the context of a parti-cular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

One embodiment of the present invention provides a system that facilitates intercepting browser communication protocol requests at a client. In addition, the system optionally fulfills the requests with content which is locally cached on the client rather than with content from a web server, which is located externally from the client. During operation, the system receives a communication protocol request at a browser's communication protocol stack. In response to the request, the system identifies a Uniform Resource Locator (URL) for the request. The system also determines if an item of content identified by the URL can be retrieved from a local cache. If so, the system fulfills the request from the local cache.

In some embodiments of the present invention, the system receives a list of URLs associated with the URL for the request. For example, the system may receive a list of URLs that are associated with images, video, audio files, cascading style sheets, and scripts, for a web page which is associated with a URL. Next, the system determines if content specified by each URL in the list of URLs is currently in the local cache. Finally, for content that is not currently in the local cache, the system downloads the content specified by each URL in the list of URLs. The system also stores the content in the local cache.

In some embodiments of the present invention, determining if the item of content identified by the URL can be retrieved from the local cache involves determining if the content specified by each URL in the list of URLs can be retrieved from the local cache.

In some embodiments of the present invention, the system periodically receives an updated list of URLs associated with the URL for the request. This can happen at a predetermined time or at a specified interval. In some embodiments, the system receives an updated list the first time the user navigates to the website in a given session. In other embodiments, the user may request to receive an updated list.

In some embodiments of the present invention, the system downloads the content specified by each URL in the list of URLs in the background while a user is using the browser.

In some embodiments of the present invention, the system determines whether a cookie associated with a user is present on the client. The system then fulfills the request from the local cache only if the cookie is present on the client. In some embodiments of the present invention, this cookie includes user preferences, such as language settings. By including such user settings in the cookie (or cookies), the system allows different users to use a different set of offline resources for the same web-based application. For example, the browser local cache may return content in English for one user and may return content in German for another user.

Note that this use of cookies can include serving different content (such as a web page) for a location referenced by an existing URL based on values stored in the cookie. In some embodiments of the preset invention different versions of the URL are store in the local cache. In some embodiments of the present invention, the content is retrieved from the server one time, stored in the local cache, and modified as it is served for multiple users based on the values stored in cookies.

In some embodiments of the present invention, the URL includes query arguments. In some embodiments, determining if the item of content identified by the URL can be retrieved from the local cache involves processing a query with the query arguments.

In some embodiments of the present invention, fulfilling the request from the local cache involves processing a server-side script in the item of content.

In some embodiments of the present invention, the system inserts a second item of content into the local cache, and subsequently sends the second item of content to the web server. For example, while interacting with the web-based application while offline, a user may "upload" a file to the web-based application. Because the user is offline, the file cannot be uploaded immediately to the web server that serves the web-based application. In this example, the system places the file into the local cache, and then uploads the file to the web server the next time (or a subsequent time) the client has a connection to the web server. To the user, it appears as if the file was uploaded while the user was offline. Note that in some embodiments of the present invention, the web-based application may include an indicator that indicates to the user that the client should be synchronized with the web server.

In some embodiments of the present invention, the communication protocol is HyperText Transfer Protocol (HTTP). However, note that any protocol for delivering web-based resources may be used.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, and devices 180.

Clients 110-112 can include any node on a network including computational capability and including a mechanism for communicating across the network.

Similarly, servers 130-150 can generally include any node on a network including a mechanism for servicing requests from a client for computational and/or data storage resources.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled to a server (such as server 150), to a client, or directly through a network.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Browser 190 is loaded on client 110. In one embodiment of the present invention, browser 190 can include any program that is capable of displaying web pages that include scripts. Note that browser 190 can be loaded on any computational device, such as clients 110-112, servers 130-150, and devices 180.

Intercepting Browser Communication Requests

Figure 2:
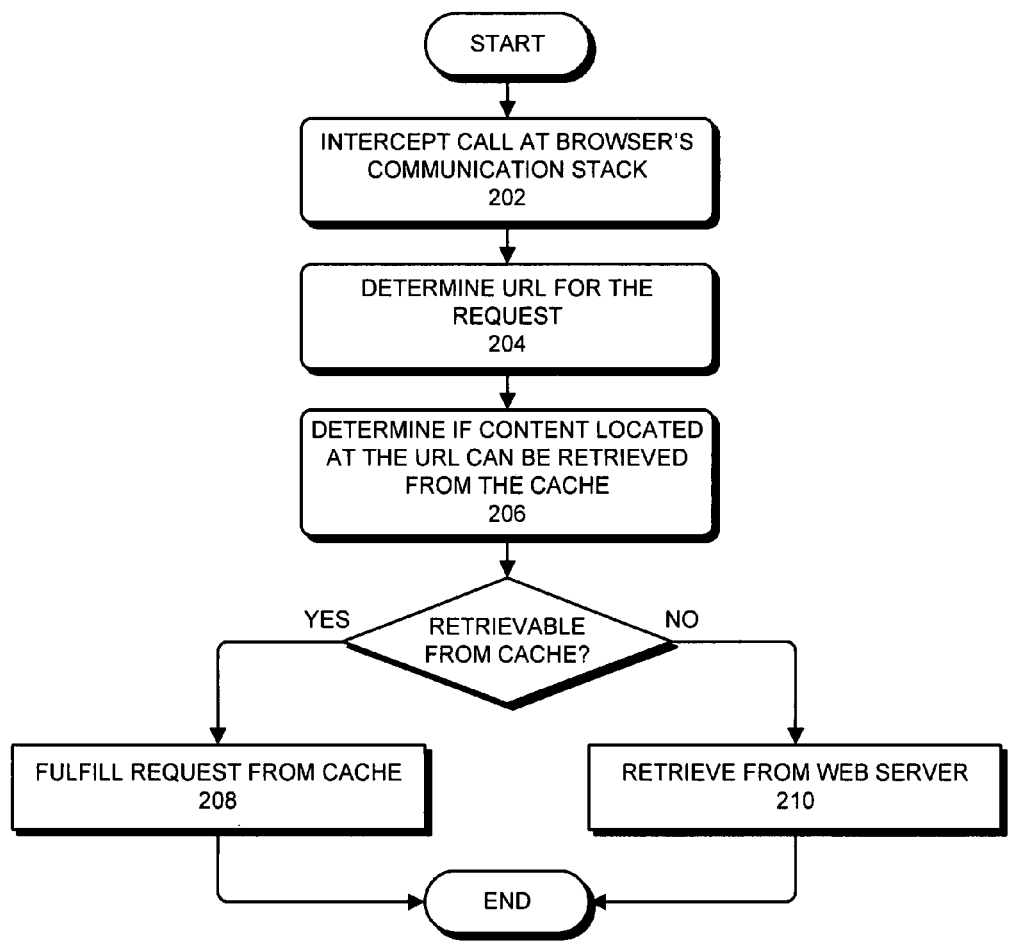
FIG. 2 presents a flow chart illustrating the process of intercepting browser communication requests in accordance with an embodiment of the present invention.

FIG. 2 presents a flow chart illustrating the process of intercepting browser communication requests in accordance with an embodiment of the present invention. During operation, the system intercepts a call at the browser 190's communication stack (operation 202). Note that this communication stack is commonly a HyperText Transfer Protocol (HTTP) stack, but in fact any communication protocol may be used. Also note that the system has hooks into the communication stack in order to intercept the communication calls. In some embodiments of the present invention, the system comprises a plug-in to the browser 190, while in other systems, the browser 190 itself is modified. In a third variation, the system is a standalone program that intercepts the calls through hooks or Application Programming Interfaces (APIs).

Next, the system determines the Uniform Resource Locator (URL) of the request (operation 204). The system also determines if the content identified by the URL can be retrieved from the local cache (operation 206). If so, the system fulfills the request from the local cache (operation 208). Otherwise, the system fulfills the request by retrieving the content from the server 150 (operation 210).

In some embodiments of the present invention, the system always retrieves the content from the local cache if the content is available in the local cache. In other embodiments of the present invention, the system always retrieves the content from the server 150 if the server 150 is reachable. In some embodiments of the present invention, the content is always retrieved from the local cache unless a specified period of time has elapsed since the content was last retrieved from the server 150.

Note that from the user 120's point of view, the system operates as if user 120 is always communicating with server 150. In other words, the process of determining if content can be retrieved from the local cache, and the process of retrieving content from the local cache, occurs in a manner that is invisible to the user 120. For example, even if the client 110 is offline and has no connection to a network 160 or server 150, user 120 enters the URL of the web application into browser 190. User 120 is then presented with the web-based application that is being served from the local cache, but it appears to user 120 as if the web-based application is being served from server 150.

In some embodiments of the present invention, when retrieving content from the local cache, the system executes any server-side scripts or logic present in the content. This can include processing any queries, including queries arguments that are included in the URL string, as well as handling any cookies or other processing that is normally handled by server 150.

Updating the Browser Local Cache

Figure 3:
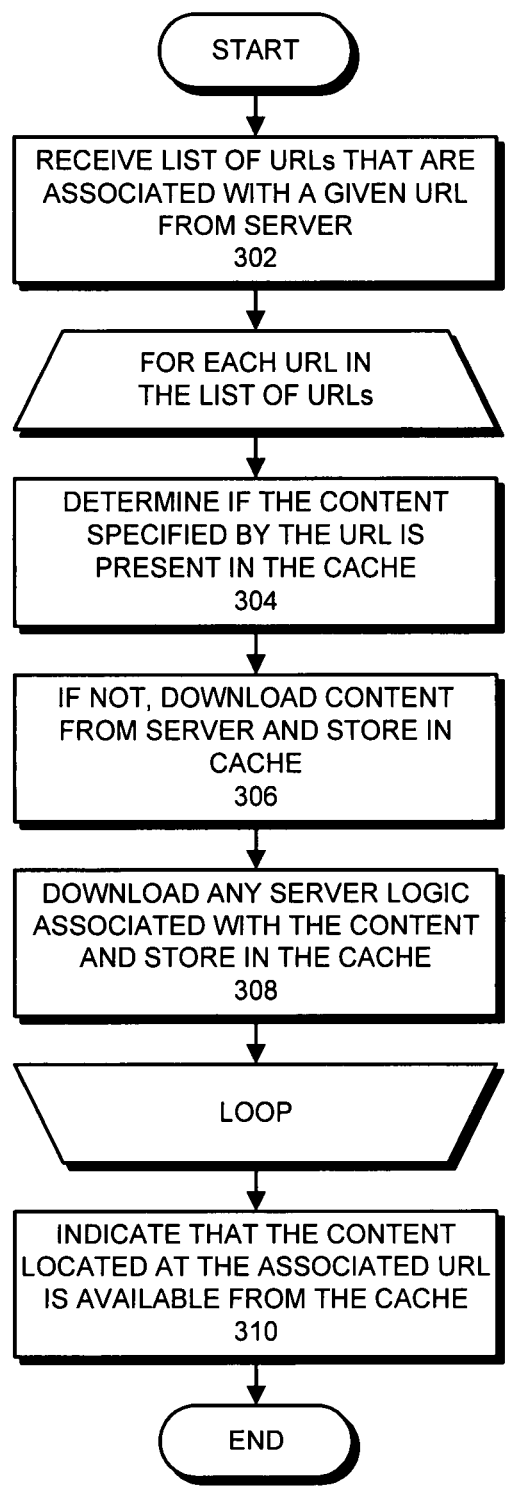
FIG. 3 presents a flow chart illustrating the process of updating the browser local cache in accordance with an embodiment of the present invention.

FIG. 3 presents a flow chart illustrating the process of updating the browser local cache in accordance with an embodiment of the present invention. During operation, the system receives a list of URLs from the server 150 that are associated with a given URL (operation 302). For example, the system may receive a list of URLs that include images, video, audio files, cascading style sheets, scripts, etc. all associated with a base URL, such as a web page.

Note that in one embodiment of the present invention, server 150 returns a list of URLs associated with the entire web-based application. In some embodiments of the present invention, no items of content are served to browser 190 from the local cache until all of the content associated with all of the URLs for the web-based application are retrieved and stored in the local cache. This facilitates upgrades to the web-based application where the client 110 will not receive any content from the local cache for a new version of the web-based application until all of the components of the new version of the web-based application have been retrieved and stored in the local cache. Thus, the new components are downloaded and stored, and the decision to server the new version or the old version of the web-based application from the local cache is atomic, based on retrieving the entire set of the content.

Next, for each URL in the list of URLs, the system determines if the content specified by the URL is present in the local cache (operation 304). If not, the system downloads the content from the server 150 and stores the content in the local cache (operation 306). The system also downloads any server logic associated with the content and stores the server logic in the local cache (operation 308).

Once all of the content associated with each URL in the list of URLs is downloaded and stored in the cache, the system indicates that the content stored at the associated URL is available from the local cache (operation 310).

Summary

Embodiments of the present invention provide a system that facilitates intercepting browser communication protocol requests at a client and serving these requests from a local cache. Intercepting the communication requests and serving the communication requests from the local cache happens in a manner that is transparent to the user 120. User 120 interacts with the web-based application via browser 190 as if client 110 is online and coupled to network 160 and server 150.

In some embodiments of the present invention, the system downloads server-side logic associated with the URLs from server 150, and stores the server-side logic in the local cache. This can include scripts, executable code, etc. The system then processes any server-side logic as the content is delivered from the local cache. In this way, the content being served from the local cache is dynamic and may appear different than the last time the content was delivered directly from server 150. This is an advantage over existing browser caches where static versions of dynamic pages are cached locally, and the same static version is subsequently served from the local cache without the server-side logic being executed.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
receiving a request associated with a user and a browser operating on a client device;
determining, by the client device, a Uniform Resource Locator (URL) associated with the request; and
acquiring, by the client device, content associated with the URL,
where acquiring the content includes:
determining that two or more versions of the content are stored in a local cache associated with the client device,
determining that a cookie, associated with the user, is available to the client device, and
retrieving, based on a value in the cookie, one of the two or more versions the content from the local cache.

2. The method of claim 1, further comprising:
receiving a list of URLs associated with the content;
determining whether data associated with each of the URLs, in the list of URLs, is stored in the local cache; and
when data associated with one of the URLs is not stored in the local cache:

acquiring the data associated with the one of the URLs, and storing the acquired data in the local cache.

3. The method of claim 2, where the request is received during a session, and where the method further includes:

determining whether the list of URLs was received during the session; and updating the list of URLs when the list of URLs was not received during the session.

4. The method of claim 2, where acquiring the data associated with the one of the URLs, in the list of URLs, further includes:

downloading the data associated with the one of the URLs while the browser is being used to access information associated with another URL that differs from the one of the URLs.

5. The method of claim 1, further comprising:

storing information in the local cache; and sending the stored information to a web server.

6. The method of claim 1, where the request is associated with communication protocol, and where the communication protocol is HyperText Transfer Protocol (HTTP).

7. A non-transitory computer-readable storage medium comprising:

one or more instructions which, when executed by a client device, cause the client device to receive a request associated with a user and a browser operating on the client device;

one or more instructions which, when executed by-the client device, cause the client device to determine a Uniform Resource Locator (URL) associated with the request; and one or more instructions which, when executed by the client device, cause the client device to acquire content associated with the URL, where the one or more instructions to acquire the content include:

one or more instructions to determine that two or more versions of the content can be retrieved from a local cache associated with the client device, one or more instructions to determine that a cookie, associated with the user of the client device is available to the client device, and one or more instructions to retrieve, based on a value in the cookie, one of the two or more versions of the content from the local cache.

8. The non-transitory computer-readable storage medium of claim 7, where the one or more instructions to acquire the content further include:

one or more instructions to receive a list of URLs associated with the content;

one or more instructions to identify data associated with a URL, in the list of URLs, that is not stored in the local cache; and one or more instructions to acquire the data associated with the URL; and one or more instructions to store the acquired data in the local cache.

9. The non-transitory computer-readable storage medium of claim 8, where the request is received during a session, and where the one or more instructions to receive the list of URLs further comprise:

one or more instructions to determine whether the list of URLs was received during the session; and one or more instructions to update the list of URLs when the list of URLs was not received during the session.

10. The non-transitory computer-readable storage medium of claim 8, where the one or more instructions to acquire the data associated with the URL further comprise:

one or more instructions to download the data while the browser is being used to access information associated with a particular URL that is different from the URL associated with the request.

11. The non-transitory computer-readable storage medium of claim 7, further comprising:

one or more instructions to store information in the local cache; and one or more instructions to send the stored information to a web server.

12. The non-transitory computer-readable storage medium of claim 7, where the request is associated with a communication protocol, and where the communication protocol is HyperText Transfer Protocol (HTTP).

13. An client device comprising:

a memory to store a plurality of versions of content; and a processor to:

receive a request associated with a user and a browser operating on the client device, determine a Uniform Resource Locator (URL) associated with the request, determine that a cookie, associated with the user, is stored in the memory, and retrieve one version, from the plurality of versions of the content stored in the memory, based on a value in the cookie.

14. The client device of claim 13, where the processor is further to:

receive a list of URLs associated with the URL associated with the request, determine whether content specified by each URL, in the list of URLs, is stored in the memory, download the content associated with a URL, in the list of URLs, when the content associated with the URL is not stored in the memory, and store the downloaded content in the memory.

15. The client device of claim 14, where the processor is further to:

receive the request during a session, and update, during the session, the list of URLs when the list of URLs is not received during the session.

16. The-client device of claim 14, where the processor is further to:

download content associated with one or more URLs, in the list of URLs, while the browser is presenting information associated with another URL that is not included in the list of URLs.

17. The client device of claim 13, where the processor is further to:

store information in the memory; and send the stored information to a web server.

18. The client device of claim 13, where the requests is associated with Hyper Text Transfer Protocol (HTTP).

19. The method of claim 1, where the URL includes query arguments, and where determining whether the content is stored in the local cache includes:

processing a query containing the query arguments; and retrieving, from the local cache, the content based on the processed query.

20. The method of claim 1, where acquiring the content further includes:

processing a server-side script included in the content.

21. The non-transitory computer-readable storage medium of claim 7, where the URL includes query arguments, and where the one or more instructions to acquire the content include:

one or more instructions to process a query containing the query arguments, and one or more instructions to acquire the content based on the processed query.

22. The non-transitory computer-readable storage medium of claim 7,
where the one or more instructions to acquire the content include:
one or more instructions to process a server-side script in the content.

23. The client device of claim 13:
where the URL includes query arguments; and
where the processor is further to:
process a query containing the query arguments
retrieve the content from the memory based on processing the query.

24. The client device of claim 13, where the processor, when retrieving the content from the plurality of content stored in the memory, is further to:
process a server-side script included in the content.

* * * * *

UNITED STATES PATENT AND TRADEMARK OFFICE
CERTIFICATE OF CORRECTION

| | |
|---|---|
| PATENT NO. | : 8,429,247 B1 |
| APPLICATION NO. | : 11/809161 |
| DATED | : April 23, 2013 |
| INVENTOR(S) | : Michael M. Nordman et al. |

It is certified that error appears in the above-identified patent and that said Letters Patent is hereby corrected as shown below:

In the Claims:

Column 7, claim 7, line 30, following the word "by", delete "-".

Column 8, claim 16, line 41, following the word "The", delete "-".

Signed and Sealed this
Eleventh Day of June, 2013

Teresa Stanek Rea
*Acting Director of the United States Patent and Trademark Office*